May 4, 1943.   G. E. PORTER   2,318,258
CONTROL MECHANISM FOR MOTOR VEHICLES
Filed July 16, 1940   3 Sheets-Sheet 1

INVENTOR
Gilbert E. Porter.
BY
Harness, Dickey & Pierce
ATTORNEYS.

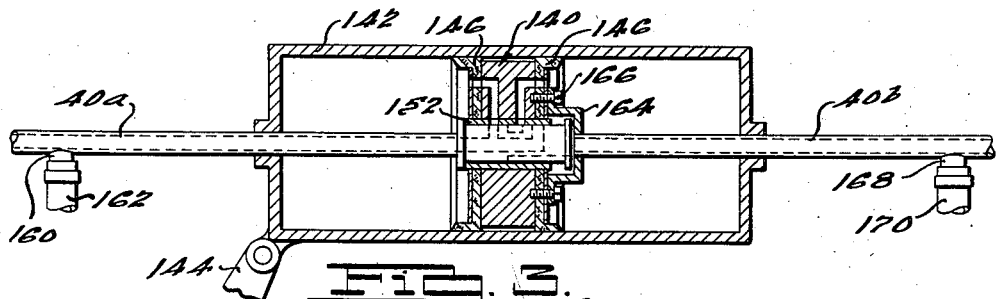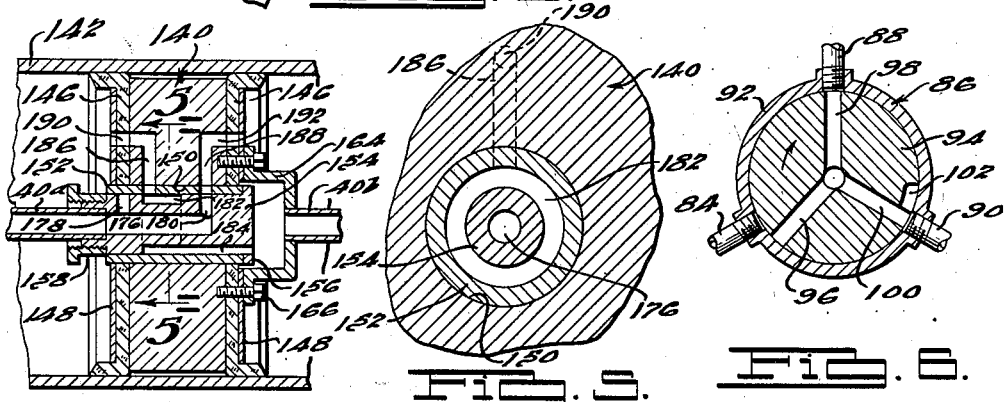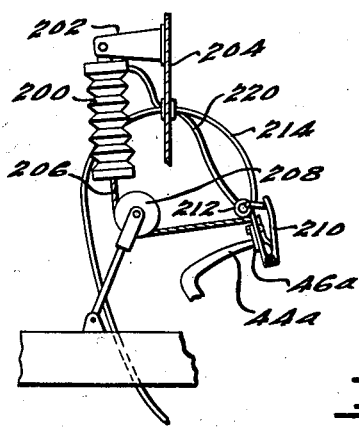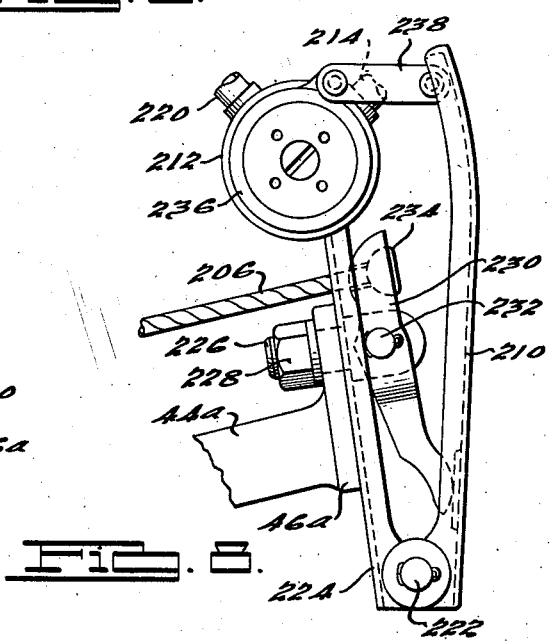

May 4, 1943.   G. E. PORTER   2,318,258
CONTROL MECHANISM FOR MOTOR VEHICLES
Filed July 16, 1940   3 Sheets-Sheet 3

INVENTOR
Gilbert E. Porter.
BY
Harness, Dickey & Pierce
ATTORNEYS.

Patented May 4, 1943

2,318,258

UNITED STATES PATENT OFFICE 2,318,258

CONTROL MECHANISM FOR MOTOR VEHICLES

Gilbert E. Porter, Mount Clemens, Mich.

Application July 16, 1940, Serial No. 345,801

9 Claims. (Cl. 192—3.5)

This invention relates to motor vehicles and particularly to control means therefor and has for its principal object the provision of a construction wherein actuation of one control member of a motor vehicle may be accompanied by automatic actuation of one or more other control members of a motor vehicle.

Objects of the invention include the provision of a construction in which the brake and clutch mechanism of a motor vehicle are so arranged and interconnected that operation of one thereof may be relied upon to effect operation of both thereof; the provision of control mechanism for a motor vehicle in which means are provided for effecting operation of the brakes and of the clutch of the motor vehicle, the two being so interconnected that operation of one may be effected and automatically accompanied by operation of the other, the accomplishment of the operation of such other being entirely under the control and at the will of the vehicle operator; the provision of a construction as above described in which the connection between the brakes and clutch is so constructed and arranged that an initial operation is accorded the one thereof before simultaneous operation of the other thereof follows; the provision of a construction as above described in which means are provided for effecting actuation of the clutch of the motor vehicle, and the control mechanism for the clutch is so connected and inter-related with the control mechanism for the brakes that an initial operating movement of the clutch is required as a condition precedent to simultaneous operation of the brakes therewith.

Other objects of the invention include the provision of a control mechanism for motor vehicles in which a force supplied to effect dis-engagement of the clutch thereof is further employed to effect a control of the transmission thereof; the provision of a construction as above described including a fluid connection between a clutch controlling member and a clutch actuating member, the transmission being provided with fluid actuated control mechanism so constructed and arranged as to enable shifting of the transmission to be accomplished as an incident to the dis-engagement of the clutch; the provision of a construction as above described in which the control of the shifting of the transmission is accomplished through the use of a follow-up valve mechanism selectively controllable by the operator of the vehicle; the provision of a construction as above described in which an initial disengaging movement of the clutch is a condition precedent to shifting of the transmission through the clutch controlling means; and the provision of a construction as above described including a novel form of pressure actuated means for controlling the shifting movements of the transmission.

Further objects of the invention include the provision of a control mechanism for a motor vehicle including a clutch, brakes and a transmission including a single control element operable to effect operation of the clutch, brakes and shifting of the transmission; the provision of a construction as above described in which initial actuation of the clutch in a dis-engaging direction is a condition precedent to actuation of the brakes and the shifting of the transmission; and the provision of a construction as above described in which the operation of the brakes through said single control element is optional and at the will of the operator.

The above being among the objects of the present invention the same consists in certain novel features of construction and combinations of parts to be hereinafter described with reference to the accompanying drawings, and then claimed, having the above and other objects in view.

In the accompanying drawings which illustrate suitable embodiments of the present invention and in which like numerals refer to like parts throughout the several different views, Fig. 1 is a more or less diagrammatic side elevational view of a motor vehicle chassis of the rear engine type illustrated as being provided with a control mechanism constructed and arranged in accordance with the present invention;

Fig. 3 is an enlarged sectional view taken axially through one of the transmission control cylinders illustrated in Fig. 2 and showing the construction of the same in greater detail;

Fig. 4 is a fragmentary still further enlarged view of the piston and central portion of the cylinder illustrated in Fig. 3 to better illustrate the details of construction thereof;

Fig. 5 is an enlarged fragmentary transverse sectional view taken on the line 5—5 of Fig. 4;

Fig. 6 is an enlarged transverse sectional view taken through the control valve illustrated in Fig. 2 in a plane perpendicular to the axis thereof;

Fig. 7 is an enlarged fragmentary, partially sectioned side elevational view of the motor vehicle shown in Fig. 1, illustrating the application of a booster mechanism to the control pedal of the present invention;

Fig. 8 is an enlarged fragmentary side elevational view of the control elements at the upper end of the pedal of the construction shown in Fig. 7;

Briefly stated the present invention provides a novel construction whereby operation of one control member of a motor vehicle by the operator thereof may be relied upon to effect operation of one or more other control members of the motor vehicle. The control member thus directly under the control of the operator may be either that for the brakes or the clutch and the secondary control member or members operated as a result of the operation of the primary control member may be the control member for the clutch or brakes respectively and/or the control members for effecting shifting of the transmission mechanism of the motor vehicle. In its preferred form the control element under the direct control of the vehicle operator is the clutch controlling pedal which, in being operated, acts through a fluid column to effect disengaging movement of the vehicle clutch. By suitable arrangements made in accordance with the present invention the displacement of fluid in such fluid column may also be relied upon to effect actuation of either the brake mechanism of the motor vehicle, actuation of the transmission shifting mechanism of the motor vehicle, or both.

Where such mechanism is employed to effect operation of the braking mechanism, means are preferably employed under the control of the vehicle operator to render actuation of the brakes by such fluid column effective or ineffective at the will of the operator. This is of particular advantage in that the operator of a motor vehicle so equipped may, by the use of one foot only, throw out the clutch of the vehicle and apply the brakes, thus leaving his other foot and both hands free to manipulate the controls or other elements of the motor vehicle, a feature which has been proven of material advantage, for instance, where a motor vehicle stalls while traveling up a relatively steep grade.

On the other hand the displacement of fluid in the column may be employed for effecting shifting of the transmission of the vehicle thereby relieving the operator from the necessity of applying sufficient power through his arms to effect such shifting movement. While both the application of the brakes and the shifting of the transmission by displacement of the fluid column employed for disengaging the clutch may obviously be used independently of one another, they may also be used in conjunction with each other in accordance with the practices of the present invention.

Figures 1, 2:
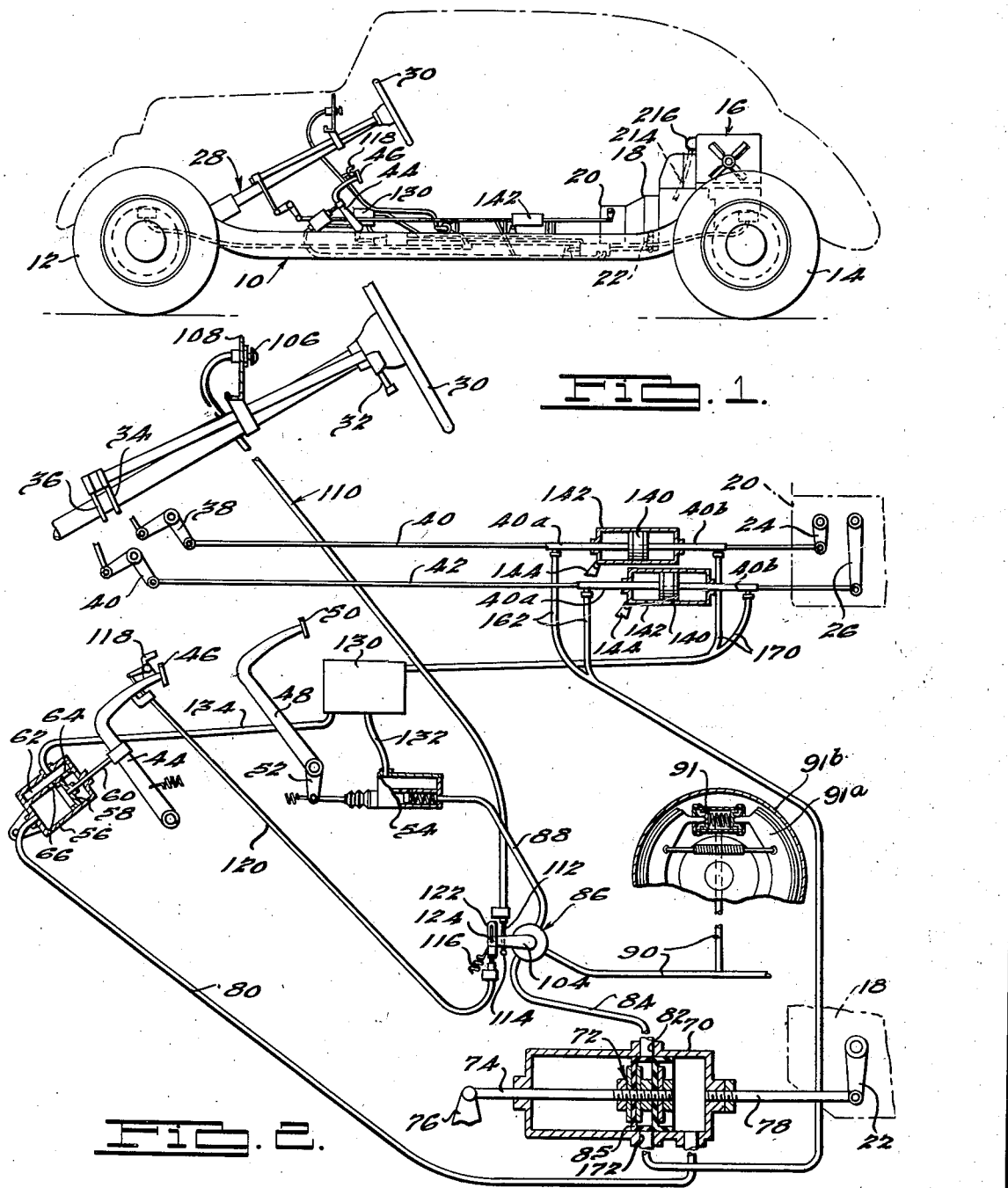
Fig. 2 is a more or less diagrammatic illustration of the control mechanism employed in the motor vehicle chassis illustrated in Fig. 1.
Figure 9:
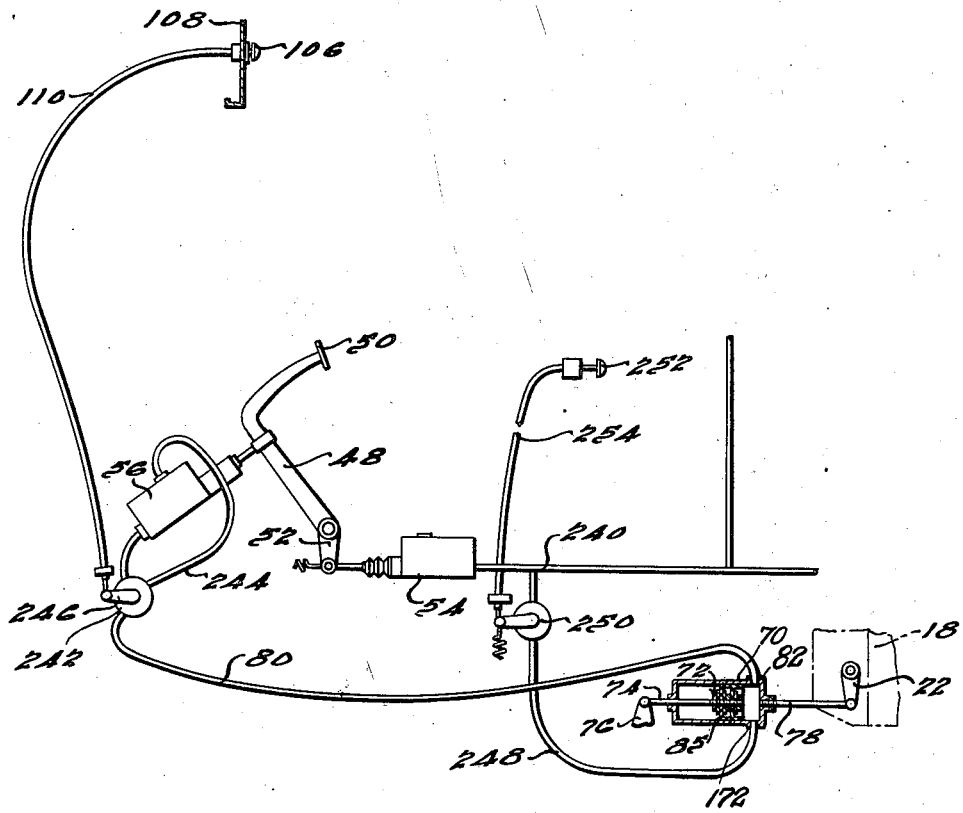
Fig. 9 is a more or less diagrammatic view illustrating simple modifications of the present invention permitting simultaneous operation of the brakes and of the clutch of a motor vehicle but permitting the operation of one to be divorced from the other at the will of the operator.

It is to be understood that the present invention is applicable to motor vehicles having their engines at the front, rear or in any other location on the same, the rear engine type being chosen for the purpose of illustration particularly for the reason that the present invention particularly lends itself to overcoming certain objectionable features in the control of rear engine drive motor vehicles as heretofore suggested. Accordingly, referring now to the accompanying drawings and particularly to Fig. 1, a motor vehicle of the rear engine type is illustrated. In the motor vehicle illustrated in Fig. 1 the vehicle is provided with a chassis frame structure indicated generally at 10 supported through the intermediary of suitable springs (not shown) from the ground by front wheels 12 and rear wheels 14. An engine indicated generally at 16 is mounted on the frame 10 adjacent the rear end thereof and is provided with a suitable or conventional clutch enclosed within the clutch housing 18 and a speed change mechanism or other suitable type of transmission mechanism contained within the housing 20. Supported by the clutch housing 18 is a lever 22 movement of which controls the engagement or dis-engagement of the clutch in a conventional manner and the transmission housing 20, as best illustrated in Fig. 2, supports a pair of levers 24 and 26, respectively, movement of which controls the shiftable position of the transmission in a conventional manner.

A steering gear indicated generally at 28 is suitably supported in the forward end of the frame 10 and carries a steering wheel 30 at its upper end through movement of which the steerable position of the front wheels 12 is accomplished in a conventional manner. Immediately below the steering wheel 30, and as best illustrated in Fig. 2, the steering gear supports a shift lever 32 through which by suitable manipulation the shiftable position of a pair of movable links 34 and 36, best shown in Fig. 2, may be selectively controlled in accordance with conventional practice. In the particular case shown the links 34 and 36 are connected respectively to bell cranks 38 and 40 which in turn are connected by rods 40 and 42, respectively, to the transmission control levers 24 and 26, respectively, the rods 40 and 42 preferably incorporating fluid pressure operating mechanism in accordance with the present invention and which will hereafter be more fully explained.

Suitably pivotally supported by the frame 10 below the steering wheel 30 is a control pedal 44 provided with the usual pedal pad 46 adjacent its upper end. Also pivotally supported adjacent the clutch pedal 44 and as best brought out in Fig. 2 diagrammatically is a brake control pedal 48 provided with a pedal pad 50 at its upper end. The brake pedal 48 is provided with a downwardly projecting arm 52 which is suitably and operatively connected to a master brake cylinder indicated generally at 54 and which may be assumed to be suitably supported in fixed relation with respect to the frame 10. Except for the modifications hereinafter described the master brake cylinder 54 may be considered to be of conventional construction and operation and suitably connected to individual wheel brake cylinders (not shown) of conventional construction mounted in cooperative relation with respect to the wheels 12 and 14.

In order to effect engagement or dis-engagement of the clutch through the clutch pedal 44, there is mounted on the frame 10 of the vehicle forwardly of the pedal 44 a master cylinder 56 which may be generally of a construction similar to the master cylinders conventionally employed in connection with hydraulic braking systems for motor vehicles but preferably including a cylinder and piston of relatively larger diameter. The master cylinder 56 is provided with a piston 58 reciprocable therein, the piston 58 being connected by its rod 60 to the clutch pedal 44 so as to be actuated thereby simultaneously therewith. It might be noted that in the particular construction of the master cylinder shown a fluid reservoir 62 is formed integrally with the master cylinder and a passage 64, which may be of relatively large dimension, is constantly open between the reservoir 62 and that end of the cylinder 56 above the piston 58, while a smaller passage 66 interconnects the cylinder 56 with the reservoir 62 at such a position as to be uncovered when the piston 58 is at the extreme end of its stroke in an inoperative direction, thereby allowing replenishment of the fluid system in accordance with well understood practice.

As also illustrated in Fig. 2, adjacent the clutch housing 18 and slightly in advance thereof a cylinder 70 is located and both ends thereof are closed. The cylinder 70 is shown relatively enlarged in Fig. 2 to more clearly illustrate details of the assembly of which it forms a part. Within the cylinder 70 is a piston indicated generally at 72 provided with a piston rod 74 slidably projecting from the forward end of the cylinder 70 and pivotally connected to a suitable support 76 fixed with respect to the frame 10 or to the power plant generally as may be found desirable. The rear end of the cylinder 70 has fixed thereto a rod 78, the rear end of which is pivotally connected to the free end of the clutch operating arm 22. Thus, the cylinder 70 is supported between the rods 74 and 78 for movement longitudinally of the rod 74. The rear end of the cylinder 70 is connected by a flexible tube 80 with the discharge end of the cylinder 56 so that when the pedal 44 is depressed, thus causing movement of the piston 58 downwardly or forwardly in the cylinder 56, fluid displaced from the cylinder 56 will flow through the tube 80 to the space between the rear end of the cylinder 70 and the rear face of the piston 72 and will cause the cylinder 70 and rod 78 to move rearwardly and thus turn the control lever 22 in a direction to cause disengagement of the clutch as will be readily understood. As will be appreciated because of this construction and the ability to use flexible tubes such as the tube 80, the location of the control pedal 44 with respect to the power plant of the motor vehicle is unimportant and, accordingly, the construction particularly adapts itself to use in motor vehicles of the rear engine type such as shown.

Where it is desired to also employ displacement of liquid from the cylinder 56 to effect actuation of the brakes of the vehicle or to maintain the brakes of the vehicle applied once such brakes are applied through the usual brake pedal 48, the following additional features may be added to the construction thus far described to obtain such results. The cylinder 70 is provided with a port or passage 82 through a side wall thereof to which a flexible tube 84 is connected. As will be understood from an inspection of Fig. 2 the port or passage 82 is located at a position longitudinally of the cylinder 70 such as to be closed by the piston 72 when the latter is in its inoperative position but which will be exposed to the fluid under pressure in the righthand end of the cylinder 70, as viewed in Fig. 2, after the cylinder 70 has moved a predetermined distance to the right, this distance preferably being such as to effect an initial dis-engaging action of the clutch of the vehicle. To aid in the proper control of the point of operation of the cylinder 70 at which the port or passage 82 will be uncovered by the piston, the piston 72 is preferably provided with a pair of cup-shaped sealing gaskets 85 the free marginal edge portions of which face in the direction of the pressure built up in the righthand end of the cylinder 70, thus insuring a well defined line of opening of the port or passage 82 during movement of the cylinder 70 and assuring sufficient sealing of the port or passage 82 against leakage from the righthand end of the cylinder 70 when such port or passage is covered by the piston 72.

In order to enable the wheel brakes of the vehicle to be selectively operated either through operation of the pedal 44 or the pedal 48, a control valve indicated generally at 86 in Fig. 2 is provided. The discharge line 88 from the master brake cylinder 54 is connected into the control valve 86 as is the tube 84 from the cylinder 70, the control valve being provided with a third tube 90 which leads to conventional wheel brake cylinders, one of which is indicated generally at 91 in Fig. 2, and through which displacement of fluid from the master cylinder 54 or master cylinder 56, as selectively controlled through the valve 86, is conducted. The wheel brake cylinder 91 is conventionally located between the ends of a pair of brake shoes 91a which operate within the brake drum 91b. As illustrated in Fig. 6, the control valve 86 includes a housing 92 provided with a cylindrical bore in which a cylindrical valve member 94 is rotatably received in sealing relation with respect to the interior walls thereof. The tubes 84, 88, and 90 connect through the walls of the housing 92 and are open to the surface of the valve member 94 therein. The valve member 94 is provided with three radially directed passages 96, 98, and 100, corresponding with the tubes 84, 88, and 90, and all connected together adjacent the center of the valve member 94. The diameter of the passages 96, 98, and 100 are preferably approximately equivalent to the passages in the corresponding tubes 84, 88, and 90 with the exception that the outer end of the passage 100 is circumferentially enlarged as at 102 for a purpose which will hereinafter be more thoroughly understood.

The angular arrangement of the passages 96, 98, and 100 is such that when the passage 96 is aligned with the tube 84, passage 98 is out of alignment with the tube 88, and when the passage 98 is in alignment with the tube 88 then the passage 96 is out of alignment with the tube 84, the passage 100 through its enlargement 102 being constantly open to the tubes 90 regardless of whether the passage 96 or the passage 98 is aligned with its corresponding tubes 84 and 88, respectively. Consequently when the valve member 94 is in the rotatable position illustrated in Fig. 6 the tube 84 is cut out from effective communication with the tube 90 while the tube 88 and consequently the master cylinder 54 is in open communication with the tube 90. On the other hand if the valve member 94 is rotated to bring the passage 96 into alignment with the tube 84, then the master cylinder 54 is cut off from communication with the tube 90 and the master cylinder 56 will be placed in open communication with the tube 90 as soon as the cylinder 70 has moved sufficiently to the right, as viewed in Fig. 2, on the piston 72 to uncover the port or passage 82. Thus by moving the valve 94 the application of the wheel brakes may be selectively controlled through either depression of the pedal 44 or depression of the pedal 48, but only through one of them at a time.

In order to control operation of the valve 86, it is exteriorly provided with an arm 104, best shown in Fig. 2, which is operatively connected with the valve member 94. The free end of the arm 104 is suitably connected and preferably through a lost motion connection with a control button or knob 106 mounted on the instrument panel 108 of the motor vehicle within easy reach of the vehicle operator, or at some other position convenient to the vehicle operator. The connection shown by way of illustration comprises a Bowden wire indicated generally at 110 and the free end of the operating wire 112 of which is slidably connected with the free end of the arm 104 and is provided with an enlargement 114 lying below the arm 104. As will be appreciated with this form of construction if the knob 106 is pulled, the wire 112 of the Bowden wire 110 will be pulled upwardly and the stop 114 acting on the arm 104 will cause it to be rotated in a clockwise direction of rotation as illustrated in Figs. 2 and 6. A suitable tension spring such as 116 is preferably provided for constantly urging the arm 104 towards its limit of movement in a counterclockwise direction of rotation, which is that illustrated in Fig. 6, and in which the master cylinder 54 is in open communication with the tube 90.

Instead of the Bowden wire for the valve 86 above described, a different type of control may be employed if desired, or it may be employed in conjunction with and in addition to the Bowden wire control 110. This control which is also illustrated in Fig. 2 comprises a bell crank member 118 pivotally mounted on the upper end of the clutch control pedal 44 with one end thereof arranged immediately above the upper edge of the pedal pad 46 as shown. The other end of the bell crank 118 is shown connected by a wire or other control member 120 with a slotted member 122 engaging a pin 124 carried by the free end of the arm 104 of the valve 86. The relation of the parts is such that the pin 124 normally lies at the lower extremity of the slot in the member 122 when the valve 86 is in its normal operative position illustrated in Fig. 6. The operator of the vehicle, however, by tipping the toe of his foot forwardly about the upper edge of the pedal pad 46 may press against the bell crank 118 and thereby actuate the slotted member 124 upwardly thereby causing the arm 104 and consequently the valve member 94 to be turned in a clockwise direction of rotation to cut the master cylinder 54 off from the tube 90 and to communicate the tube 84 with the tube 90. As will be observed the relation of the two separate controls described for the valve 86, that is through the control button 106 and through the bell crank 118, is such as to permit the valves to be controlled through either one or the other of these members without interference from one or the other.

The use of the bell crank control for the valve 86 thus described is particularly convenient in that the operator of the vehicle by tipping the toe of his foot forwardly with respect to the upper edge of the pedal pad 46 may by simply pressing down on the pedal pad 46 simultaneously throw out the clutch of the vehicle and at the same time effect application of the brakes of the vehicle, thus leaving his other foot free to operate the starter or the accelerator of the vehicle and enabling him to release the brakes of the vehicle when desired by simply tipping his foot backwardly on the clutch pedal 46 and without necessitating immediate reengagement of the clutch. At the same time it will be understood that the operator of the vehicle may press down the pedal 44 to throw out the clutch, and press down on the pedal 48 to apply the brakes of the vehicle, and then after the brakes are firmly set, by tipping the toe of his foot on the pedal pad 46 forwardly to cut-off the master brake cylinder 54 and connect the brakes to the master brake cylinder 56, take his foot off of the brake pedal 48 without relieving the brakes. It goes without saying that by suitable operation of the control button 106 the same results may be obtained through force applied through the operator's hands rather than by movement of the bell crank 118 through movement of the operator's foot.

With the construction thus far described there is a possibility, by shifting the valve 86 when both the clutch and brake pedals are depressed, to cause a transfer of fluid between the master cylinder 54 for the braking system and the master cylinder 56 actuated by the clutch pedal 44. In order to guard against impoverishing either one system or the other of fluid through such an occurrence, the following mechanism is provided. A supply tank 130 serving as a liquid reservoir for both the master cylinders 54 and 56 is provided on the vehicle and preferably at a sufficient height above the various liquid circuits as to permit it to be constantly open to the atomsphere through a suitable vent or the like. The reservoirs for both the master cylinder 54 and master cylinder 56 are closed and are connected by tubes 132 and 134, respectively, with the supply tank. By employing the reservoir 130, the separate reservoirs on the master cylinders 54 and 56 may be eliminated entirely if desired, providing the tubes 132 and 134, respectively, are arranged in open communication with the openings shown between the individual reservoirs and the interiors or bores of these master cylinders.

It will be appreciated that by the use of the reservoir 130 any excess liquid fed into one master cylinder will escape therefrom into the tank 130 and likewise any deficiency occurring in either of the master cylinders will be replaced by liquid from the reservoir 130.

In accordance with a further phase of the present invention and regardless of whether the braking system of the vehicle may be applied or held in applied position through actuation of the clutch pedal 44, means may be provided for effecting shifting of the transmission of the vehicle through pressure built up on the liquid in the master cylinder 56 through depression of the clutch pedal 44. In order to effect this result, the rods 40 and 42 interconnecting the transmission shift levers 24 and 26, respectively, with the control lever 32 below the steering wheel 30 are each provided with a piston 140 thereon as indicated in Fig. 2, and each consists of two sections having a lost motion connection with each other through the piston 140 as will hereinafter be described. Slidably mounted upon each rod 40, 42 in surrounding relation with respect to each of the pistons 140 is a cylinder 142 suitably held against axial movement but allowed to float laterally of its axis by means of a suitable bracket 144 pivotally secured thereto and suitably mounted upon the vehicle frame 10. The pistons 140 and their cylinders 142 are identical and consequently the description of one will suffice for the description of both and, accordingly, it will be assumed that the upper piston and cylinder assembly shown in Fig. 2 will be the one chosen for the description of both.

Referring to Figs. 3, 4, and 5, and particularly Fig. 4, it will be noted that the piston 140 is provided on each axial face thereof with an outwardly opening cup-shaped sealing washer 146 formed from leather or other suitable flexible material and secured in place against the corresponding axial face of the piston by means of a metal plate or ring 148 suitably fixed to the piston 140. The piston 140, sealing rings 146 and clamping rings 148 are provided with central axial bore 150 in which is a fixed cylindrical bearing bushing or sleeve 152. Axially slidably received in the bore of the sleeve 152 and suitably held against rotational movement therein is a valve member 154 having an annular outwardly directed flange 156 at its righthand end which limits movement of the valve 154 to the left as viewed in Fig. 4, and a nut member 156 at the opposite end also serving as an outwardly annular directed flange on the valve member 154 which cooperates with the corresponding end of the sleeve 152 to limit movement of the valve member 154 to the right as viewed in Fig. 4. The flange 156 and the nut member 158 permit a material but limited amount of axial movement of the valve 154 in the bushing 152.

A portion of the rod 40 immediately to the left of the piston 140, as viewed in the figures and indicated at 40a, is of hollow or tubular construction and its righthand end is fixed to the left hand end of the valve 154 by means of a nut 158. Adjacent the lefthand end the tube 40a is provided with a connection 160 which, as illustrated in Fig. 2, is connected to a flexible tube 162. A short length of the rod 40 immediately to the right of the piston 140, as viewed in the figures, and indicated at 40b, is also of tubular construction and its forward or lefthand end is sealed and fixed to the bottom wall of a cup-shaped member 164 secured and sealed to the rear or righthand of the piston 140 by means of screws 166, the opening in the cup-shaped member being of a sufficient size to freely receive the corresponding end of the valve 154 therein. The righthand end of the tube 40b at a point outwardly of the cylinder 142 is provided with a connection 168 by means of which it is interiorly connected to a flexible tube or hose 170. It will thus be observed that the tube 40a has a relative axial movement with respect to the tube 40b equal to the amount of relative axial movement of the valve member 154 in the sleeve 152. This provides the lost motion in each of the rods 40 previously mentioned.

As best illustrated in Fig. 2, the tube 170 for each of the cylinders 142 is connected into the reservoir 130 and the tubes 162 for both the cylinders 140 are connected together and extend to a port 172 in the cylinder 70 preferably in transverse alignment with the port 82 therein. Consequently the tubes 162 are normally closed by the piston 72 when the clutch pedal 44 is in its normal inoperative position. As previously explained the position of the ports 82 and 172 in the cylinder 70 are such that when the pedal 44 is depressed, axial displacement of the cylinder 70 with respect to the piston 72 is caused to a sufficient extent to either partially or fully disengage the clutch of the vehicle and in any event the resistance to movement of the clutch, brakes and/or transmission is so arranged, that disengagement of the clutch will always precede application of the brakes or shifting of the transmission when actuated through the master cylinder 56, and re-engagement of the clutch, upon release of pressure on the pedal 44, will always follow release of the brakes or completion of the transmission shifting operation.

Referring again to Figs. 3, 4 and 5 and particularly to Fig. 4, it will be noted that the tube 40a is interiorly open to a passage 176 located axially within the valve 154. The valve 154 is provided with two transverse passages 178 and 180 extending radially from the passage 176. The passages 178 and 180 are spaced from one another axially of the valve 154 and the surface of the valve 154 midway between the passages 178 is peripherally grooved as at 182 and the passage 182 is connected by a longitudinally extending groove 184 in the periphery of the valve 154 with the space within the cup-shaped member 164 and is consequently open to the interior of the tube 40b.

The piston 140 is provided with a pair of axially spaced radially directed passages 186 and 188, respectively, also passing through the bushing 152, each connected by an axially parallel passage 190 and 192, respectively, with the corresponding axial face of the piston 140 through the corresponding sealing ring 146 and clamping ring 148. The passages 186 and 188 are spaced axially of the piston 140 a distance less than the axial spacing of the passages 178 and 180 in the valve 154 and by such distance that when either the passage 178 is aligned with the passage 186 or the passage 180 is aligned with the passage 188 the other of the passages 186 or 188 lies in open communication with the annular groove 182.

When the valve 154 is at one extremity of its relatively movable position in the piston 140, illustrated at its extreme lefthand position of movement in Fig. 4, the interior of the tube 40a is communicated through the bore 176 and passages 180, 188, and 192 with the interior of the cylinder 142 on the righthand side of the piston 140 and the interior of the cylinder 142 on the lefthand side of the piston 140 is communicated through the passages 190, 186, 182, and 184 and through the interior of the cup-shaped member 164 with the interior of the tube 40b. Under such conditions if the clutch pedal 44 is depressed, liquid in the master cylinder 56 will be displaced through the tube 80 to the cylinder 70 and being exerted under pressure in the cylinder 70 will cause the latter to move to the right as viewed in Fig. 2 a sufficient distance to disengage the clutch of the vehicle, and then to uncover the port 172 which will permit such liquid under pressure to flow up through the tube 162 and into the tube 40a, thus exerting a sufficient amount of pressure on the righthand side of the piston 140 to move the piston 140 and consequently that section of the rod 40 to the right of the piston 140 in Fig. 4, including the section 40b, to the left as viewed in the figures, the liquid displaced from the lefthand end of the cylinder 142 flowing out through the tube 40b and flexible tube 179 back to the reservoir 130. The piston 140, being directly and positively connected to the transmission shift lever 24, positively causes an equivalent movement thereof. However if the lefthand section of the tube 40 including the section 40a, is not moved from the initial position illustrated in Fig. 4, then as the piston 140 moves to the left as viewed in the figures, such movement will act to close off the passage 180 from the passage 188 and consequently as soon as these passages are moved out of alignment with each other, further movement of the piston 140 will cease. In order that movement of piston 140 to the left under the conditions described will continue, it will be necessary for the operator to urge the control member 32 below the steering wheel 30 in a direction constantly tending to pull the lefthand section of the rod 40, including the tube 40a, to the left as viewed in Fig. 2 so as to maintain the passages 180 and 188 aligned. It will thus be appreciated that the valve mechanism thus provided for controlling the piston 140 is of the follow-up type enabling any desired relative movement of the piston 140 in the cylinder 142 to be obtained.

It will be readily understood that if the valve 154 is at the righthand limit of its relative movement in the piston 140 instead of the lefthand limit illustrated in Fig. 4, then under such circumstances the passages 178 and 186 will be aligned with each other and under the conditions assumed liquid under pressure will flow into the lefthand end of the cylinder 142 and the passage 180 and annular groove 182 being aligned under such circumstances, liquid will be displaced from the righthand end of the cylinder 142 out through the tubes 40b back to the reservoir 130, and the reverse movement of the piston 140 and rod 40 will occur. When the valve 154 is in its intermediate position of movement in opposite directions in the piston 140, the annular groove 182 is of insufficient length axially of the piston to bridge both passages 186 and 188, and the surface of the valve between the passage 182 and the passages 178 and 180 will bridge the inner ends of the passages 186 and 188 so as to maintain the piston 140 in a neutral position and prevent the flow of any fluid to or from the cylinder 142. It will also be appreciated that the operator of the vehicle, through suitable and conventional manipulation of the gear shift lever 32, may select which piston 140 is to be operated and the direction of operation thereof by the pressure produced in the cylinder 56 upon depression of the pedal 44.

From the above, it will be understood that the operator of the vehicle, by suitably manipulating the control lever 32 and pressing on the clutch pedal 44, is enabled to first disengage the clutch of the vehicle and then effect shifting of the transmission to any speed selected, the only effort required by the operator through his hands being a sufficient effort to shift the valve 154 in the piston 140 and the effort applied by the operator through the master cylinder 56 furnishing the actual force required to shift the transmission. It will also be appreciated that the transmission may be shifted without depressing the pedal 44 as in such case, in the absence of pressure being exerted upon the pistons 140, as soon as the valve 154 has moved in the piston 140 to one extremity of its shiftable position therein, the force exerted through the valve against the piston will cause the piston to be shifted an amount sufficient to effect shifting of the transmission entirely by manual force applied through the control handle 32. This feature provides a more or less emergency means of insuring control of the transmission should the pressure supplied to the master cylinder 56 by depression of the foot pedal 44 fail for any reason or other.

From the foregoing description, it will be appreciated that by the practices of the present invention means are provided whereby the operator of a motor vehicle, by simply depressing the clutch control pedal, is enabled not only to disengage the clutch of the vehicle but may further by such movement obtain power to effect application of the brakes of the vehicle, shifting of the transmission of the vehicle, or both, with all of the above described and other attendant advantages.

Particularly in vehicles of larger sizes, the added work accomplished during depression of the clutch control pedal may make it desirable to employ some suitable type of booster device for the clutch control pedal to relieve the operator of a large part of the work which would otherwise be required in depressing the clutch pedal. While any suitable type of booster mechanism may be employed for this purpose there is illustrated in Figs. 7 and 8, merely by the way of illustration, one suitable type that forms the subject-matter of my Letters Patent of the United States for improvements in Brake operating mechanism No. 2,250,033, issued July 21, 1941. As illustrated in Fig. 7 this booster mechanism includes a power element having a movable wall illustrated as a bellows 200 supported at one end by a bracket 202 mounted on the dash 204 of the motor vehicle. The opposite or movable end of the bellows is connected by a cable 206 which passes under a pulley 208 with a control device mounted on the pedal pad 46 and including a control pedal 210 and control valve 212. One side of the valve 212 is connected by a flexible tube 214 with the intake manifold 216 of the engine 16 which drives the vehicle and which is shown in Fig. 1. The other side of the valve 212 is connected by a flexible tube 220 with the bellows 200.

Referring now to Fig. 8 which illustrates the control device for the bellows 200 in greater detail, it will be noted that the control pedal 210 is pivoted at 222 upon a base or supporting member 224 fixed to the face of the pedal pad 46a by means of a bolt 226 and nut 228. A double armed lever 230 is pivoted at 232 between its ends to the head of the bolt 226, one end of the lever 230 bearing against the inner face of the control pedal 210 in spaced relation from the axis of the pivot pin 222 and the cable 206 is connected to the opposite end of the lever 230 by means of a ball joint 234. The valve 212 includes a rotatable valve element 236 connected by a link 238 with the free end of the control pedal 210. The pull of the bellows 200 acting through the cable 206 normally tends to draw the upper end of the lever 230 forwardly and press the lower end thereof rearwardly, thus tending to move the control pedal 210 to a position in which the valve element 236 will serve to cut-off communication between the intake manifold 216 and the bellows 200 and open the interior of the bellows 200 to the atmosphere. When the upper end of the control pedal 210 is pressed downwardly or forwardly the valve element 236 is moved first to cut-off the interior of the bellows 200 from the atmosphere and then to connect it to the interior of the intake manifold 216, the consequent tendency to contract the bellows 200 acting through the cable 206 to move the clutch pedal 44a in a clutch disengaging direction. If after initial operation of the valve 212 by the operator pressing the upper end of the control pedal 210 forwardly, the movement of the operator's foot in a forwardly direction is arrested, the continued inward movement of the clutch pedal in a clutch dis-engaging direction will cause the control pedal 210 to rotate relatively in a clockwise direction and cause the valve member 236 to be moved to cut-off communication between the intake manifold and the bellows, thus arresting